United States Patent [19]  
Erikson et al.

[11] 4,249,426
[45] Feb. 10, 1981

[54] ANTI-BACKLASH NUT HAVING LONGITUDINAL FLEXURAL MEMBERS WITH RAMPS THEREON AND MEANS TO APPLY AN AXIAL PRE-LOAD FORCE TO SAID RAMPS

[75] Inventors: Kenneth W. Erikson, Merrimack; Keith W. Erikson, Nashua, both of N.H.

[73] Assignee: Kerk Motion Products, Inc., Nashua, N.H.

[21] Appl. No.: 925,269

[22] Filed: Jul. 17, 1978

[51] Int. Cl.³ .................. F16H 55/18; F16B 39/36
[52] U.S. Cl. .................. 74/441; 74/424.8 A; 411/262; 411/278; 411/280
[58] Field of Search ............... 74/441, 440; 151/19 R, 151/7, 21 R, 21 C; 85/32 V; 74/424.8 A

[56] References Cited
U.S. PATENT DOCUMENTS

| 750,675 | 1/1904 | Michelin | 151/19 R |
| 1,140,594 | 5/1915 | Howe | 151/19 R |
| 1,326,598 | 12/1919 | Jaques | 151/19 R |
| 2,567,483 | 9/1951 | Hotine | 74/441 |
| 3,977,269 | 8/1976 | Linley | 74/441 |

FOREIGN PATENT DOCUMENTS 912009  4/1946  France .............................. 151/19 R Primary Examiner—Ramon S. Britts
Attorney, Agent, or Firm—Hamilton, Brook, Smith & Reynolds

[57] ABSTRACT

An anti-backlash nut having one or more longitudinal flexural members with one end fixed and one end free-floating is disclosed which undergoes translational movement along a shaft. This anti-backlash nut is improved by providing ramps at the free-floating ends of the flexural members and means to apply axial forces on the ramps to thereby create radial force vectors which maintain the ramps in contact with the shaft even after the nut has become worn.

10 Claims, 13 Drawing Figures

U.S. Patent  Feb. 10, 1981  Sheet 1 of 2  4,249,426
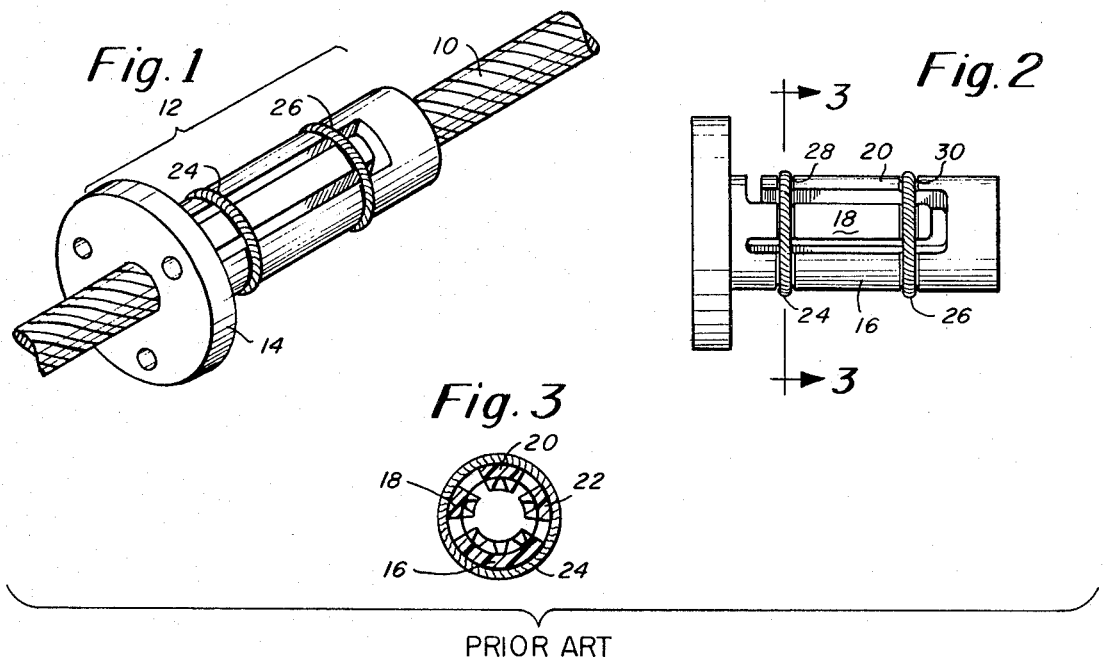
PRIOR ART
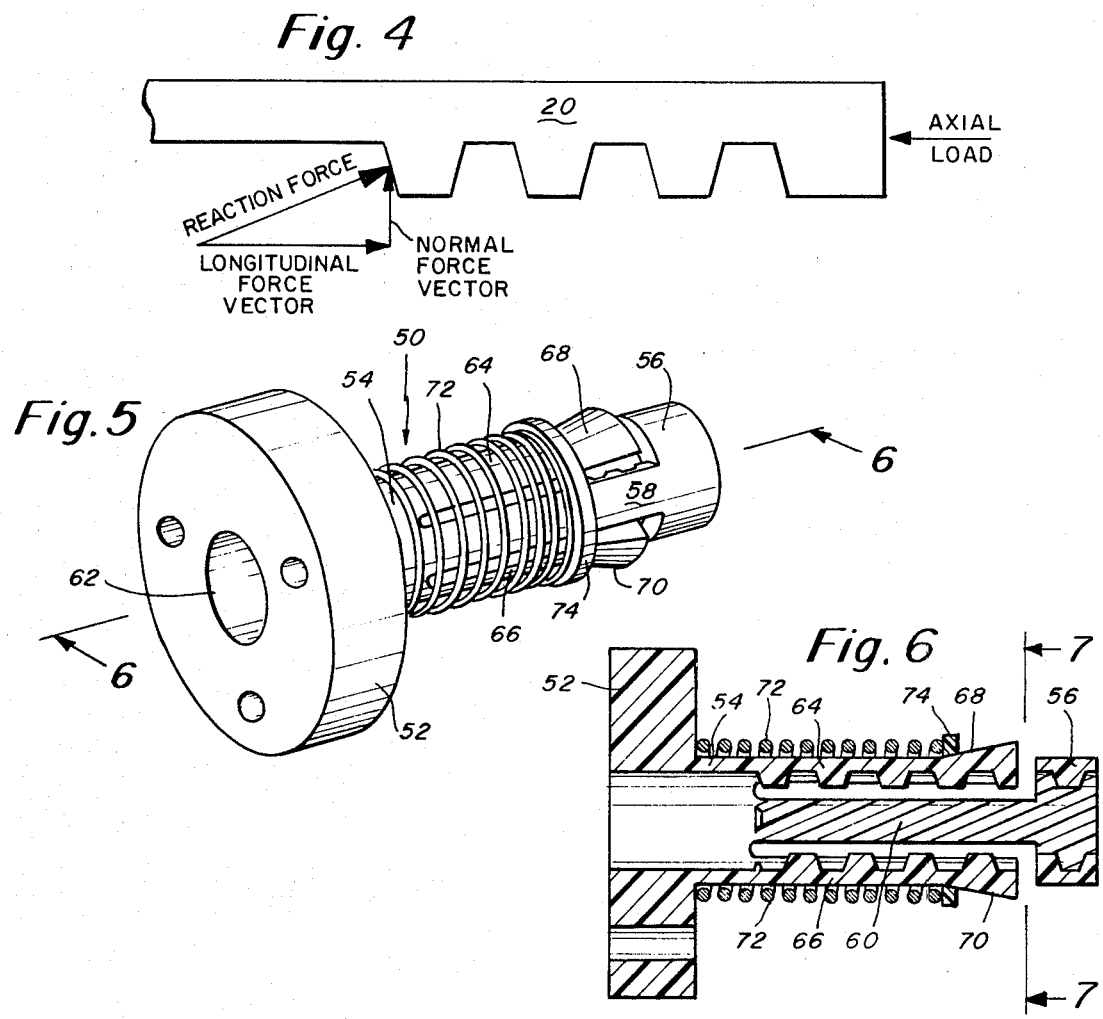

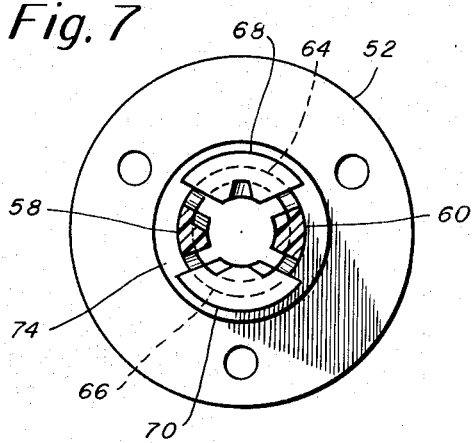
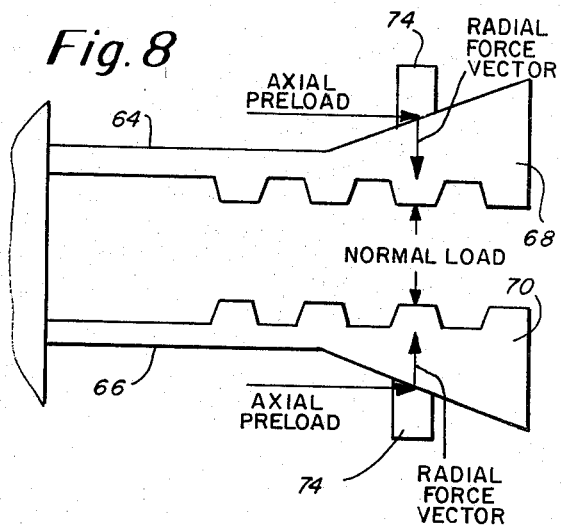
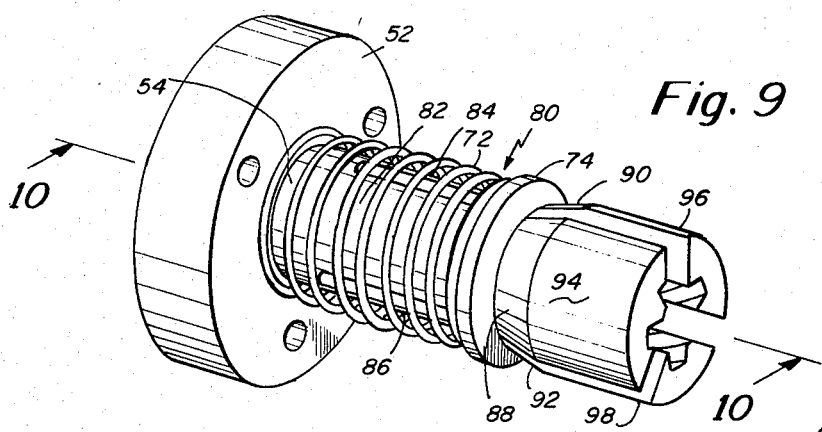
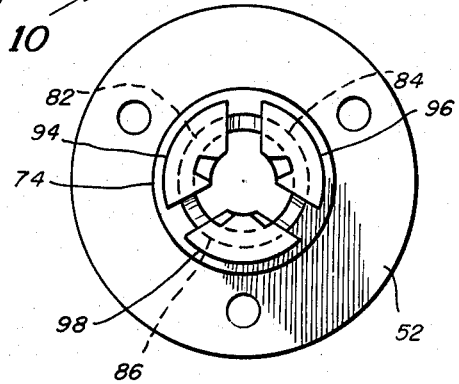
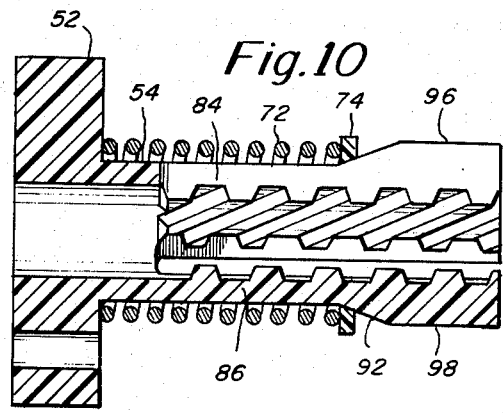
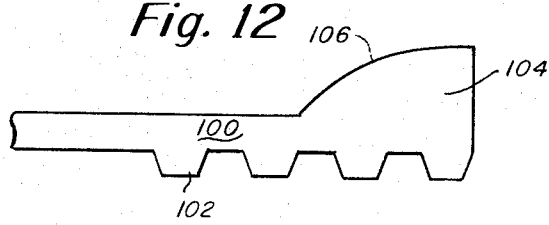
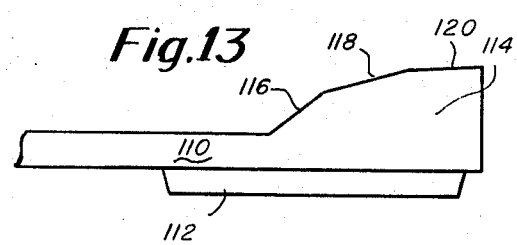

ANTI-BACKLASH NUT HAVING LONGITUDINAL FLEXURAL MEMBERS WITH RAMPS THEREON AND MEANS TO APPLY AN AXIAL PRE-LOAD FORCE TO SAID RAMPS

BACKGROUND OF THE INVENTION

1. Field of the Invention

This invention is in the field of anti-backlash nuts designed to provide uniform translational movement in either direction along a threaded screw in response to relative rotational movement between the nut and screw.

2. Description of the Prior Art

In many applications, it is important to drive an element of a machine along a screw with accurate positional repeatability and constant drag torque in the forward and reverse direction. Data printers and x-y tables, used as peripheral equipment in the computer industry, for example, have such requirements.

Positioning devices designed to meet these requirements have been proposed, and many of these employ an anti-backlash nut to achieve the positional accuracy along the screw which is required. Examples of two such anti-backlash nut assemblies which have been proposed are described in the patent literature as follows.

In U.S. Pat. No. 3,656,358, issued to Kopp, a linear positioning device is disclosed which is stated to have an improved collar for use with a comparatively inexpensive rod having multiple grooves. The collar is telescoped over and adapted to be translated back and forth relative to the elongated rod. This collar includes cantilevered fingers which are resiliently wedged into angularly spaced grooves formed in the rod to preload the collar onto the rod and prevent rotational play from developing between the two. In a specific embodiment, the collar is telescoped onto a rod in the form of a splined shaft while in another embodiment, the collar is a nut threaded onto a screw with multiple threads.

In U.S. Pat. No. 3,997,269, issued to Linley, an anti-backlash, self-aligning nut construction with specially constructed tubular nut bodies which coact with concentric spring sleeves is described. The nut bodies, in general, each have a pair of spring-biased elements provided with internal thread formations adapted for engagement with the external threads of a screw. In one embodiment, a self-aligning spring sleeve is provided having solely three pairs of oppositely-disposed transverse slots to obtain the desired aligning features. The nut body has a base portion which is separated from the spring-biased elements by means of two transverse slots which, together with an adjacent pair of slots in the spring sleeve, form in effect a universal joint. One of the remaining slot pairs in the sleeve is oriented circumferentially with respect to the first pair by an angle of 90°, with a third pair of slots being circumferentially aligned with the first pair.

More recently, an anti-backlash nut having oppositely-directed longitudinal flexure members has been disclosed in U.S. application Ser. No. 907,518, filed May 19, 1978. This anti-backlash nut has a continuous portion extending longitudinally from one end of the screw to the other. In addition, there are at least two, and usually more, oppositely-directed longitudinal flexure members which have one end fixed to the anti-backlash nut and one end free-floating. The oppositely-directed longitudinal flexure members are biased towards the screw by one or more radial springs or other means for biasing.

While the anti-backlash nut described in U.S. application Ser. No. 907,518 has proven to be very successful, it sometimes suffers a problem after the threads on the nut have become worn. This problem relates to the fact that when an axial load is applied to this nut there is an opposite force of reaction directed towards the inclined surface of the nut thread. Since this surface of the nut thread is inclined, the force of reaction is broken into an axial or longitudinal force vector and a normal force vector. The normal force vector tends to force the nut away from the screw, and in many cases can overcome the normal force towards the screw which is created by the radial spring.

SUMMARY OF THE INVENTION

This invention relates to an anti-backlash nut which is designed to undergo translational movement along a shaft, such as an externally threaded screw or a spline. The nut has a bore with shape which is complementary to the external shape of the shaft. In addition, there is at least one, and usually more, longitudinal flexure members which have one end fixed to the nut and one end free-floating along the shaft. In one embodiment, each of a plurality of longitudinal flexure members is fixed at the same end of the anti-backlash nut so that they extend in the same direction. In another embodiment, each of a plurality of longitudinal flexure members is alternately fixed at opposite ends of the nut so that they extend in opposite directions.

The improvement of this invention comprises the provision of ramps on the free-floating ends of the flexural members together with axial biasing means for providing an axial preload force on these ramps. This can be conveniently done by mounting an axial compression spring around the nut with a hollow ring mounted at the base of the ramps. The axial compression spring forces the hollow ring as far up the ramps as is possible thereby producing radial force vectors which insure that the longitudinal flexure members maintain good contact with the shaft even after the internal structure of the bore of the nut becomes partially worn.

Thus, the anti-backlash nut of this invention retains the advantages of nut described in copending application Ser. No. 907,518 and, in addition, overcomes normal force vectors created when an axial load is applied.

BRIEF DESCRIPTION OF THE DRAWINGS

FIG. 1 is a perspective view illustrating an anti-backlash nut and screw assembly wherein the nut has longitudinal flexural members of the type heretofore described in the prior art;

FIG. 2 is a side elevational view of the anti-backlash nut illustrated in FIG. 1;

FIG. 3 is a cross-sectional view of the anti-backlash nut of FIG. 1;

FIG. 4 is a partial diagrammatic view of an anti-backlash nut of FIGS. 1-3 showing an enlarged view of the internal thread and illustrating the force vectors created by the force of reaction to an axial load force;

FIG. 5 is a perspective view of one embodiment of an anti-backlash nut according to this invention and having two longitudinal flexure members fixed at the same end of the nut and having ramps at their free-floating ends;

FIG. 6 is a cross-sectional view taken along section line 6—6 in FIG. 5;

FIG. 7 is a cross-sectional view taken along sectional line 7—7 in FIG. 6;

FIG. 8 is a partial diagrammatic view of the anti-backlash nut of FIGS. 5-7 illustrating the radial force vectors created by the axial pre-load provided by a compression spring bearing on the ramps of the longitudinal flexural members;

FIG. 9 is a perspective view illustrating an alternative embodiment of an anti-backlash nut according to this invention in which the nut has a continuous circumferential portion at oné end only and three longitudinal flexure members extending therefrom with ramped portions at their free-floating ends;

FIG. 10 is a longitudinal cross-sectional view of the anti-backlash nut of FIG. 9 taken along sectional line 10—10;

FIG. 11 is an end view of the anti-backlash nut of FIGS. 9 and 10 taken along site line 11—11 in FIG. 10; and, FIGS. 12 and 13 are side elevation views of still further embodiments of ramped flexural members according to this invention.

DESCRIPTION OF PREFERRED EMBODIMENTS

This invention can be further described by referring to the Figures in more detail.

FIGS. 1-3 illustrate an anti-backlash nut assembly as described in copending application Ser. No. 816,983. Thus, it can be seen in FIG. 1 that this assembly has an externally threaded screw 10 having thereon an anti-backlash nut 12. Anti-backlash nut 12 has a faceplate 14 integrally attached to it and containing three equally spaced attachment holes so that an element to be driven can be easily attached to nut 12 by bolting it thereto. As relative rotational movement occurs between screw 10 and nut 12, nut 12 undergoes translational movement along screw 10 and thus drives the element fastened to it in a longitudinal direction. If the relative rotational movement is then reversed, such as by rotating screw 10 in the opposite direction, nut 12 undergoes translational movement in the reverse longitudinal direction. As stated previously, it is quite often important to achieve highly accurate positioning of nut 12 in both longitudinal directions in response to the same degree of rotation of screw 10.

Some of the design features of anti-backlash nut 12 can be more clearly seen in FIGS. 2 and 3. Therein, it can be seen that continuous portion 16 extends from one end to the other of nut 12 in the longitudinal direction. The extent to which continuous portion 16 extends circumferentially will vary depending upon the exact application for anti-backlash nut 12, but is chosen to provide sufficient flexural stiffness while still allowing for relief of screw thread inconsistencies without significant binding.

Anti-backlash nut 12 has three oppositely-directed longitudinal flexure members 18, 20 and 22. Flexure members 18 and 22 are each fixed at one end of anti-backlash nut 12, that being the end to which faceplate 14 is attached. Flexure member 20, on the other hand, is fixed at the opposite end of nut 12. Each of flexure members 18, 20 and 22 extend longitudinally for a substantial length and are free-floating at their unfixed ends. They could, of course, be shorter or longer than illustrated.

Radial springs 24 and 26 are positioned in slots 28 and 30, respectively, extending around the periphery of anti-backlash nut 12. The purpose of radial springs 24 and 26 is to bias flexure members 18, 20 and 22 towards screw 10 so that good contact is always maintained between the external thread on screw 10 and the complementary internal threads on flexure members 18, 20 and 22 and continuous portion 16.

While anti-backlash nut 12 illustrated in FIGS. 1-3 has proven highly successful, it does suffer some problems which can occur under certain conditions. For example, it can be appreciated that radial springs 24 and 26 contribute directly to the adverse condition of frictional drag. Because of this, it is necessary to maintain this radial preload created to a minimum value by employing radial springs 24 and 26 which have relatively low spring constants.

FIG. 4 is a partial diagrammatic view of longitudinal flexure member 20 and illustrates one problem which can occur under high axial loading of nut 12. In response to an axial load applied, which may be due to inertial affects or system drag, there is a force of reaction which bears on the thread form of element 20. Since this force of reaction bears on an inclined surface of the thread, it is split into a longitudinal force vector and a normal force vector. Unfortunately, the normal force vector acts to oppose the radial force vector applied by radial spring 24 or 26. In cases where the axial load is high relative to the radial force applied by springs 24 and 26, the normal force vector of the reaction force can entirely overcome the radial force of spring 24 or 26. When this condition occurs, flexure member 20 is forced away from the screw thread and the intimate contact necessary for proper operation of the anti-backlash nut 12 is lost.

It should also be noted that as the thread on flexure element 20 wears, the intimate contact will also be lost.

FIGS. 5-7 illustrate one embodiment of an improved anti-backlash nut 50 which overcomes the aforementioned problems. Anti-backlash nut 50 has a faceplate 52 which contains equally spaced attachment holes so that an element to be driven along a screw can be attached to nut 50, such as by bolting it thereto. Anti-backlash nut 50 has a circumferentially continuous portion 54 at its faceplate end and a circumferentially continuous portion 56 at its opposite end. Additionally, it contains two longitudinal continuous portions 58 and 60 which are located directly across from each other on opposite sides of the screw which extends through the bore 62 of anti-backlash nut 50.

Anti-backlash nut 50 has two longitudinal flexure members 64 and 66, each of which is fixed at the faceplate end of nut 50 and free-floating at the opposite end. Longitudinal flexure members 64 and 66 have ramps 68 and 70, respectively, positioned at the outer surface of their free-cloating ends. Ramps 68 and 70 are shown to have an incline of about 20° degrees, but can have a wide range of slopes depending upon the length of the flexure members, the particular application involved, etc.

Axial spring 72 is mounted around anti-backlash nut 50 and held in compression between faceplate 52 and ring member 74 which is located at the base of ramps 68 and 70. As can be appreciated, ring 74 will slide up ramps 68 and 70 as far as possible under the axial force supplied by spring 72.

FIG. 8 illustrates the force vectors created by the combination of ramps 68 and 70, axial spring 72, and ring 74. Because axial spring 72 is held in compression, it creates an axial pre-load which bears longitudinally on ring 74. This force is transmitted by ring 74 to the inclined surfaces of ramps 68 and 70, which convert part of the axial pre-load force into a radial force vector which opposes the normal reaction-force vector tending to force the longitudinal flexure members 64 and 66 away from the thread of the screw. It should also be noted that, as the internal thread of anti-backlash nut 50 wears, longitudinal flexure members 64 and 66 are maintained in intimate contact with the thread of the screw because of the radial force vectors created by the combination of names with the axial compression spring.

FIGS. 9-11 illustrate an alternative embodiment of an anti-backlash nut 80 according to this invention. In these figures, elements which are the same as elements in FIGS. 5-7 have been given same numerals.

Anti-backlash nut 80 has only one continuous circumferential portion 54, which is located at its face-plate end. At the opposite end, there is no circumferentially continuous portion.

Three longitudinal flexure members 82, 84 and 86 are fixed to nut 80 at the faceplate end, but are free-floating at their opposite ends. Longitudinal flexure members 82, 84 and 86 have ramps 88, 90 and 92, respectively, at the outside surface of their free-floating ends. Additionally, each of ramps 88, 90 and 92 terminate in circumferentially planar surfaces 94, 96 and 98, respectively, each of which have a larger circumferential diameter than the rest of anti-backlash nut 80.

Anti-backlash nut 80 operates in a similar manner to anti-backlash nut 50 previously described, except for the difference in the longitudinal flexure members. The axial compression spring 72 still applies an axial load to ring 74 which slides up ramps 88, 90 and 92 as far as it can. The axial pre-load force is then broken down by ramps 88, 90 and 92 into its various vectors, one of which is a radial force vector which maintains each of longitudinal flexure members 82, 84 and 86 in intimate contact with the screw extending through the bore of anti-backlash nut 80.

It will be recognized, of course, that the anti-backlash nut of this invention can have any number of longitudinal flexural elements. In addition, these elements can be fixed at the same end of the anti-backlash nut or fixed in an alternate fashion, or otherwise, at opposite ends thereof.

It should also be recognized that the term "ramps" is used herein in its most generic sense. It is not limited to a surface having a linear slope or curve. In fact, it is believed that ramps with any linear or higher order curve, such as a paralolic curve, or any combination of these, may be suitable. Examples of other embodiments or ramps having different surfaces thereon are shown in FIGS. 12 and 13.

In FIG. 12, flexural member 100 is illustrated with external thread 102 on the inner wall of its bore. Ramp 104 has a curved surface 106 thereon. This can be an advantage in some cases since it tends to apply less force in the radial direction when the anti-backlash nut is new, and more force in the radial direction as the anti-backlash nut wears during its life.

In FIG. 13, flexural element 110 has a spline-matching surface 112 thereon. Ramp 114 has an operative surface formed from three linear surfaces, 116, 118, and 120, which have decreasing slopes. Thus, more radial force is applied by surface 118 than surface 116, and still further radial force is applied by surface 120.

The anti-backlash nuts described herein can be fabricated to form a wide variety of materials including many metals and polymeric compositions. Preferred materials are polymeric compositions which have low friction and are self-lubricating. An example of such a polymeric composition is self-lubricating polyacetal.

Those skilled in the art will recognize, or be able to ascertain using no more than routine experimentation, many equivalents to the specific components, elements, steps, materials, etc., described herein. Such equivalents are intended to be covered by the following appended claims.

What is claimed is:

1. In an anti-backlash nut designed to move along a screw in either of two longitudinal directions, said nut including one or more longitudinal flexure members having one end fixed and one end free-floating:

the improvement comprising providing upwardly inclined ramps on the exterior of the free-floating ends of said longitudinal flexure members and means for applying an axial force to each of said ramps, said axial force being substantially constant in either direction of motion of said nut.

2. An anti-backlash nut designed to undergo bidirectional translational movement along a screw having an external thread thereon in response to relative rotational movement between the anti-backlash nut and screw, said nut having an internal thread complementary to the external thread on said screw and said nut comprising, in combination:

a. one or more longitudinal flexure members having one end fixed and one end free-floating, said longitudinal flexure members having an upwardly inclined ramp on their outer surfaces, and, b. means for directly applying an axial force to the ramp on each of said flexure members which axial force is converted by the angle of the ramp to a radial force which urges the flexure members inwardly whereby the internal thread of said flexure members is maintained in close contact with the external thread of said screw regardless of which direction the nut travels on the thread.

3. An anti-backlash nut of claim 2 wherein said nut has a circumferentially continuous portion at one end thereof.

4. An anti-backlash nut of claim 3 wherein said means for applying an axial force comprises an axial compression spring.

5. An anti-backlash nut of claim 4 wherein said anti-backlash nut has a plurality of longitudinal flexure members with a ramp at their free-floating ends.

6. An anti-backlash nut of claim 5 wherein each of said plurality of longitudinal flexure members is fixed at the same end of said anti-backlash nut.

7. An anti-backlash nut of claim 5 wherein said anti-backlash nut has a circumferentially continuous portion at both ends thereof.

8. An anti-backlash nut of claim 7 wherein each of said longitudinal flexure members is fixed at the same end of said anti-backlash nut.

9. An anti-backlash nut of claim 7 wherein said longitudinal flexure members are alternately fixed at opposite ends of said nut.

10. An anti-backlash nut for translation along a shaft, comprising, in combination:

a. one or more longitudinal flexure members having one end fixed and one end free-floating, said longitudinal flexure members having an upwardly inclined ramp on their outer surfaces;

b. spring means coaxial to said flexure members for applying an axial force to the ramp on each of said flexure members;
c. an internal structure on said flexure members complementary to the external structure of said shaft; and,
d. said ramp having more than one angle of inclination whereby the axial force applied to said ramp may be varied as the internal structure of the flexure members engages with the external structure of said shaft.

* * * * *